United States Patent

[11] 3,607,124

| | | |
|---|---|---|
| [72] | Inventor | Richard Zippel<br>12-17, Bremer Strasse, 344 Eschwege, Germany |
| [21] | Appl. No. | 792,287 |
| [22] | Filed | Jan. 21, 1969 |
| [45] | Patented | Sept. 21, 1971 |
| [32] | Priority | Feb. 21, 1968 |
| [33] | | Germany |
| [31] | | P 17 29 539.5 |
| | | Continuation-in-part of application Ser. No. 688,525, Dec. 6, 1967. |

[54] MULTISTAGE MIXING DEVICES WITH TIME STAGGERED INPUTS
1 Claim, 2 Drawing Figs.

[52] U.S. Cl............................................ 23/285,
23/252, 23/260, 260/95, 259/67, 259/66, 259/8,
137/624.18, 137/205
[51] Int. Cl.................................................. B01j 4/02

[50] Field of Search.......................................... 23/285,
252, 283, 260; 260/95, 95 C, 96; 259/61, 64, 65,
66, 67, 7, 8, 6, 4; 137/624.18, 205

[56] References Cited
UNITED STATES PATENTS

| 2,788,953 | 4/1957 | Schneider...................... | 259/4 |
| 3,031,271 | 4/1962 | Weinbrenner et al. ........ | 23/252 |
| 3,164,374 | 1/1965 | Ralph............................ | 259/8 X |
| 3,179,380 | 4/1965 | Drayer......................... | 259/8 |

Primary Examiner—James H. Tayman, Jr.
Attorney—Nolte and Nolte

ABSTRACT: A device for mixing multicomponent plastic materials prepared from fast-reacting prepolymers comprises at least two mixing chambers with stirring devices, the chambers communicating with each other for material to flow through the chambers in succession, components of the material and, if desired, additives being fed to the chambers through valves, of which those of the second chamber are operable with a delay relatively to those of the first chamber.

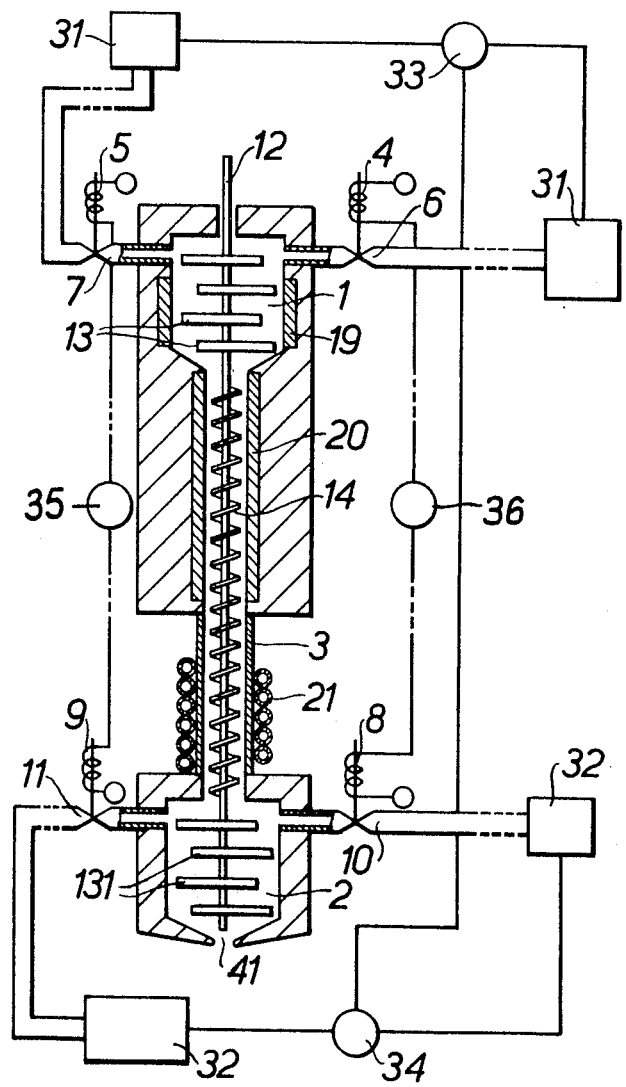

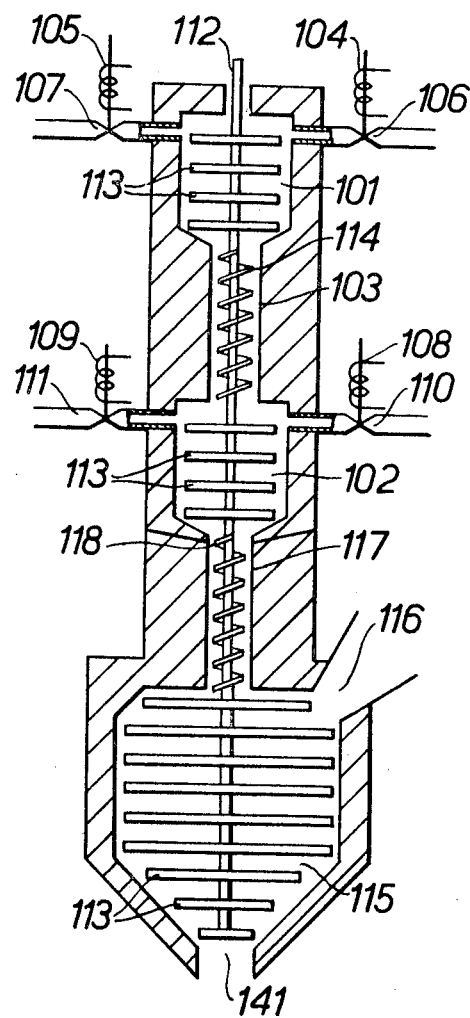

MULTISTAGE MIXING DEVICES WITH TIME STAGGERED INPUTS

BACKGROUND OF THE INVENTION

The invention relates to mixing devices and more specifically to device for mixing multicomponent plastic materials prepared from fast reacting prepolymers, and mixtures of such materials with additives, the devices having mixing chambers equipped with stirring devices, the individual components being fed to the mixing chambers through pipes closable by valves.

Multicomponent plastic materials are available which, after mixing, react quickly and harden within a short time. For mixing such materials, mixing chambers have been proposed, to which the plastic materials are fed under pressure in accurately defined quantities through valves and in which they are intimately mixed by rotating stirring devices. After mixing, the mixture is discharged from the mixing chambers by feeding further multicomponent plastic materials to the chambers. The individual components are available in the trade as liquids, in drums in which they can be stored.

However, multicomponent plastic materials exist with which previously proposed mixing devices cannot cope, since the individual components when mixed directly do not yield the desired hardened plastic material. In these cases, prepolymers are first prepared and subsequently mixed with further components. The preparation of the prepolymers outside a mixing chamber is sometimes possible, namely when the prepolymers have comparatively long reaction times from about a quarter of an hour to about 1 hour. The result of the reaction must not be mixed with further components until the reaction is completed. In many cases, however, the reaction times of those components which form the prepolymers are much shorter, for example the order of minutes or seconds. In such cases, it is extremely difficult to mix the required quantities of prepolymers. When the prepolymers have to be processed by the addition of further components within only a few seconds after having been prepared and it is not possible to mix all the components together simultaneously, the multicomponent plastic materials could hitherto only be produced manually in test tubes. Therefore, such plastic materials, notwithstanding their excellent properties, could hitherto not be employed for manufacturing purposes, because hitherto it was not possible to carry out the difficult mixing in a machine normally operating without interruptions. The difficulties are increased when a plant is required for producing and processing prepolymers of different lengths of reaction times.

It is an object of the present invention to provide a device for mixing multicomponent plastic materials prepared in an intermediate stage from fast reacting prepolymers, and to mix mixtures of such materials with additives, the mixing device being capable of dealing with prepolymers having a wide range of different reaction times without the need for time-consuming conversion work.

SUMMARY OF THE INVENTION

The invention consists in a mixing device comprising at least a first mixing chamber and a second mixing chamber, the chambers being arranged in succession and having stirring devices, the material being fed intermittently under pressure by means of flowmetering pumps operable in timed relationship to each other, first means for delaying the flow of material from the first mixing chamber to the second mixing chamber, and second means for delaying the feed of material to the second mixing chamber relatively to the feed of material to the first mixing chamber.

Preferably, the stirring devices of the mixing chambers have a common spindle, whereby the design of the mixing device is simplified. chamber.

The first delaying means may comprise a long and narrow pipe communicating with the first and second mixing chambers. Preferably, in the pipe between the first and second mixing chambers, a worm is provided for slowing down the flow of material from the first mixing chamber to the second mixing chamber. Owing to the provision of the worm a comparatively long path is provided for the material to travel from the first to the second mixing chamber. Furthermore, the material flows through along the worm only when a considerable pressure is created in the first mixing chamber by fresh material fed to the first mixing chamber.

The worm is preferably fixed to the common spindle of the stirring devices, whereby the worm and the spindle move jointly together. If the worm is so arranged that it rotates in a sense to oppose the flow of material, particularly intimate mixing is achieved, since the material remains longer in contact with the rotating worm.

Additives can also be mixed to the mixture of components by the mixing device.

It is advisable to provide heating or cooling arrangements or both for a least one of the mixing chambers and for the connections between the mixing chambers or for both, since in some cases the speed of reaction can be considerably increased by heating or reduced by cooling.

BRIEF DESCRIPTION OF THE DRAWINGS

To make the invention clearly understood reference will now be made to the accompanying somewhat diagrammatic drawings, which are given by way of example and in which:

FIG. 1 shows a mixing device comprising two mixing chambers arranged in succession; and FIG. 2 shows a mixing device comprising three mixing chambers arranged in succession.

DESCRIPTION OF THE PREFERRED EMBODIMENTS

The mixing device of FIG. 1 comprises a first mixing chamber 1 and a second mixing chamber 2. The components of a prepolymer are mixed in the first mixing chamber 1, the reaction between the components of the prepolymer takes place in a pipe 3 connecting the first mixing chamber 1 to the second mixing chamber 2. Further material is mixed with the prepolymer in the second mixing chamber 2 after the prepolymer has left the pipe 3. Feed pipes 6 and 7, through which the components of the prepolymer are fed and which are closable by valves 4 and 5 respectively, lead into the first mixing chamber 1. Feed pipes 10 and 11, which are closable by valves 8 and 9, respectively lead into the second mixing chamber 2 and serve for feeding components which are to be mixed with the prepolymer fed to the second mixing chamber 2 through the connecting pipe 3 to produce the multicomponent plastic material. The first and second mixing chambers 1 and 2 are provided with a common stirring spindle 12, which carries stirring blades 13 within the first mixing chamber 1 and stirring blades 131 within the second mixing chamber 2. The stirring spindle 12 also carries a worm 14 within the connecting pipe 3, the worm 14 being such that, in operation, it opposes the direction of flow of material through the connecting pipe 3.

The various components are fed under pressure to the first and second mixing chambers 1 and 2 through the pipes 6, 7, 10 and 11 and the valves 4, 5, 8 and 9 by flowmetering pumps known per se and diagrammatically indicated at 31 and 32, the pumps 31 and 32 being operable intermittently in timed relationship to one another so that the operation of the pumps 32 for the second mixing chamber 2 is delayed relatively to the operation of the pumps 31 for the first mixing chamber 1. The operation of the pumps 31 and 32 is timed by timing means known per se and indicated at 33 and 34. The operation of the valves 8 and 9 is delayed relatively to the operation of the valves 4 and 5 by operating and timing devices known per se and diagrammatically indicated at 35 and 36.

When the mixing device is started the valves 4 and 5 leading to the first mixing chamber 1 are initially opened so long that the first mixing chamber 1 and the connecting pipe 3 are filled by the pumps 31 with components of the prepolymer.

The walls of the first mixing chamber 1 are provided with electric means 19 for heating the prepolymer components so as to accelerate the reaction. Further electric heating means 20 are arranged around a portion of the connecting pipe 3 adjacent the first mixing chamber 1, for accelerating the reaction in said portion of the connecting pipe 3. Around a portion of the connecting pipe 3 adjacent the second mixing chamber 2, a cooling coil 21 is provided for ensuring that the previously heated prepolymer does not cause an unduly fast reaction between the prepolymer and the components added to it in the second mixing chamber 2. The cooling means 21 effectively cool the material before it reaches the second mixing chamber 2 whereby to make the desired mixing process possible and, in the embodiment shown to ensure that reaction takes place outside the second mixing chamber 2.

In FIG. 2 parts corresponding to similar parts in FIG. 1 are indicated by corresponding reference numerals but increased by "100." Thus, for example, the first mixing chamber 1 of FIG. 1 is indicated by reference numeral 101 in FIG. 2.

FIG. 2 shows a mixing device having a third mixing chamber 115 to which additives are fed through a feed inlet 116. The stirring spindle 112 is extended into the third mixing chamber 115, within which it is fitted with stirring blades 113. Within a pipe 117 connecting the second mixing chamber 102 to the third mixing chamber 115, the stirring spindle 112 carries a worm 118 acting analogously to the worm 14 of the device of FIG. 1.

The second mixing chamber 2 of FIG. 1 and the third mixing chamber 115 of FIG. 2 have outlet openings 41 and 141 respectively for the discharge of mixed material.

EXAMPLE

For the preparation of cement-bonded expanded polyurethane, the cement has to be in the form of an aqueous suspension. If the components of the plastic material in connection with which a metallic catalyst, for example tin octanoate, is used for hardening, were mixed directly with the aqueous suspension of cement, the water of the suspension might lead to the destruction of the catalyst and would prevent any chemical reaction. To overcome this difficulty, the components of the multicomponent plastic material and the metallic catalyst are mixed in the first mixing chamber 1 or 101 and the aqueous suspension of cement is added in the second mixing chamber 2 or 102. If a further additive, for example sand, is to be added to the mixture, this is done in the third mixing chamber 103 of FIG. 2.

With the devices described, it is possible to make first a prepolymer and then, after a delayed admission of the prepolymer to the second mixing chamber 2 or 102, the final multicomponent plastic material. In this way, multicomponent plastic materials which have to be produced in an intermediate stage become available for industrial purposes. By changing the worm 14 or 114 the delay of flow of material from the first mixing chamber 1 or 101 to the second mixing chamber 2 or 102 can be varied and suited to the reaction times required by the prepolymers. Moreover, the mixing devices are usable whenever mixing in a plurality of stages is required.

I claim:

1. An apparatus for mixing a multicomponent plastic material prepared by chemical reaction of components to form a prepolymer which is then reacted with at least one further component to form said plastic material which chemical reactions proceed very rapidly, which comprises a first mixing chamber having at least two inlet conduits for the introduction of components to be reacted to form said prepolymer in said first mixing chamber, a valve in each of said inlet conduits, a flowmetering pump associated with each of said inlet conduits for intermittently pumping said component materials into said first mixing chamber, a second mixing chamber arranged in series with said first mixing chamber and connected by a conduit through which conduit the material discharged from said first mixing chamber may flow into said second mixing chamber, said connecting conduit being constructed for retarding the flow of material from said first mixing chamber into said second mixing chamber, stirring means disposed of in each of said first and second mixing chambers, a worm disposed in said conduit connecting said first and second mixing chambers, each of said stirring means and said worm being mounted for rotation on a common shaft, at least one inlet conduit for the introduction of a component into said second mixing chamber, a valve in said conduit, a flow metering pump associated with said conduit for intermittently pumping said component into said second mixing chamber, separate coordinating means for coordinating the flow of components into said first and second mixing chambers, heating means disposed about the lower end of said first mixing chamber and the upper portion of said connecting conduit for accelerating the reaction of the components contained therein and ensuring completion of their reaction before introduction of the resultant material into said second mixing chamber, and colling means disposed about the lower portion of said connecting conduit and the upper portion of said second mixing chamber for ensuring that the material introduced into said second mixing chamber from said connecting conduit does not react too rapidly with the reaction component introduced into said second mixing chamber.